United States Patent [19]
Holder

[11] Patent Number: 6,067,940
[45] Date of Patent: May 30, 2000

[54] PORTABLE CORRAL

[75] Inventor: Tommie J. Holder, Snyder, Okla.

[73] Assignees: Jerry J. Dunlap, Oklahoma City; Larry Phillips, Roosevelt, both of Okla.; part interest to each

[21] Appl. No.: 09/082,104

[22] Filed: May 20, 1998

[51] Int. Cl.$^7$ ................................................. A01K 1/00
[52] U.S. Cl. .................... 119/512; 119/514; 119/519; 119/843
[58] Field of Search .................. 119/512, 513, 119/514, 502, 519, 843, 752; 296/24.2; D30/108

[56] References Cited

U.S. PATENT DOCUMENTS

| | | | |
|---|---|---|---|
| 16,181 | 12/1856 | Hoge | 119/502 |
| 179,519 | 7/1876 | Cameron | 119/512 |
| 256,661 | 4/1882 | Tarragon | 119/512 |
| 327,665 | 10/1885 | Dawson | 119/502 |
| 418,313 | 12/1889 | Duckworth . | |
| 739,507 | 9/1903 | Reingardt | 119/453 |
| 932,380 | 8/1909 | Fleming | 119/511 X |
| 1,381,892 | 6/1921 | Bute | 119/512 |
| 2,691,359 | 10/1954 | Anstiss et al. | 119/512 |
| 2,729,196 | 1/1956 | Breitenbach | 119/512 |
| 3,002,493 | 10/1961 | Galamba | 119/514 |
| 3,017,860 | 1/1962 | Wilson | 119/752 |
| 3,336,908 | 8/1967 | Swanson | 119/512 |
| 3,726,256 | 4/1973 | Bernhardt et al. | 119/512 |
| 3,921,585 | 11/1975 | Hall | 119/512 |
| 4,250,836 | 2/1981 | Smith | 119/512 |
| 4,341,181 | 7/1982 | Fair | 119/512 |
| 4,366,775 | 1/1983 | Tyquin | 119/512 |
| 4,537,151 | 8/1985 | Bolton | 119/512 |
| 4,619,223 | 10/1986 | Koehn | 119/512 |
| 4,821,679 | 4/1989 | Hackert | 119/502 |
| 4,829,936 | 5/1989 | Mollhagen | 119/843 |
| 4,924,813 | 5/1990 | Bixler et al. | 119/848 |
| 5,115,763 | 5/1992 | Wilson | 119/512 |
| 5,237,960 | 8/1993 | Wilson | 119/514 |
| 5,381,757 | 1/1995 | Putney | 119/512 |
| 5,899,171 | 5/1999 | Abrahamson | 119/512 |

FOREIGN PATENT DOCUMENTS

| | | | |
|---|---|---|---|
| 942108 | 2/1974 | Canada | 91/7 |
| 727832 | 4/1980 | U.S.S.R. | 119/840 |
| 1468480 | 3/1989 | U.S.S.R. | 119/343 |
| 654216 | 6/1951 | United Kingdom | 119/20 |

*Primary Examiner*—Peter M. Poon
*Assistant Examiner*—Yvonne R. Abbott
*Attorney, Agent, or Firm*—Dunlap, Codding & Rogers, P.C.

[57] ABSTRACT

A portable corral which is folded into a retracted position behind a towing vehicle for transport from one location to another, and is folded to an expanded, usable configuration for movement along side the path of travel of the towing vehicle to trap cattle or the like who may, for example, be feeding in the path of movement of the corral.

10 Claims, 8 Drawing Sheets

# PORTABLE CORRAL

BACKGROUND OF THE INVENTION

Various portable corrals have been constructed in the past. However, in all known constructions, the corral cannot conveniently be towed in a position to surround one or more animals in such a manner that the animals may be trapped by moving the corral around the animals, rather than driving the animals in to the corral.

CROSS-REFERENCE TO RELATED APPLICATIONS

Not applicable.

STATEMENT REGARDING FEDERALLY SPONSORED RESEARCH

Not applicable.

SPECIFICATION

DETAILED DESCRIPTION OF THE PREFERRED EMBODIMENT

Figure 1:
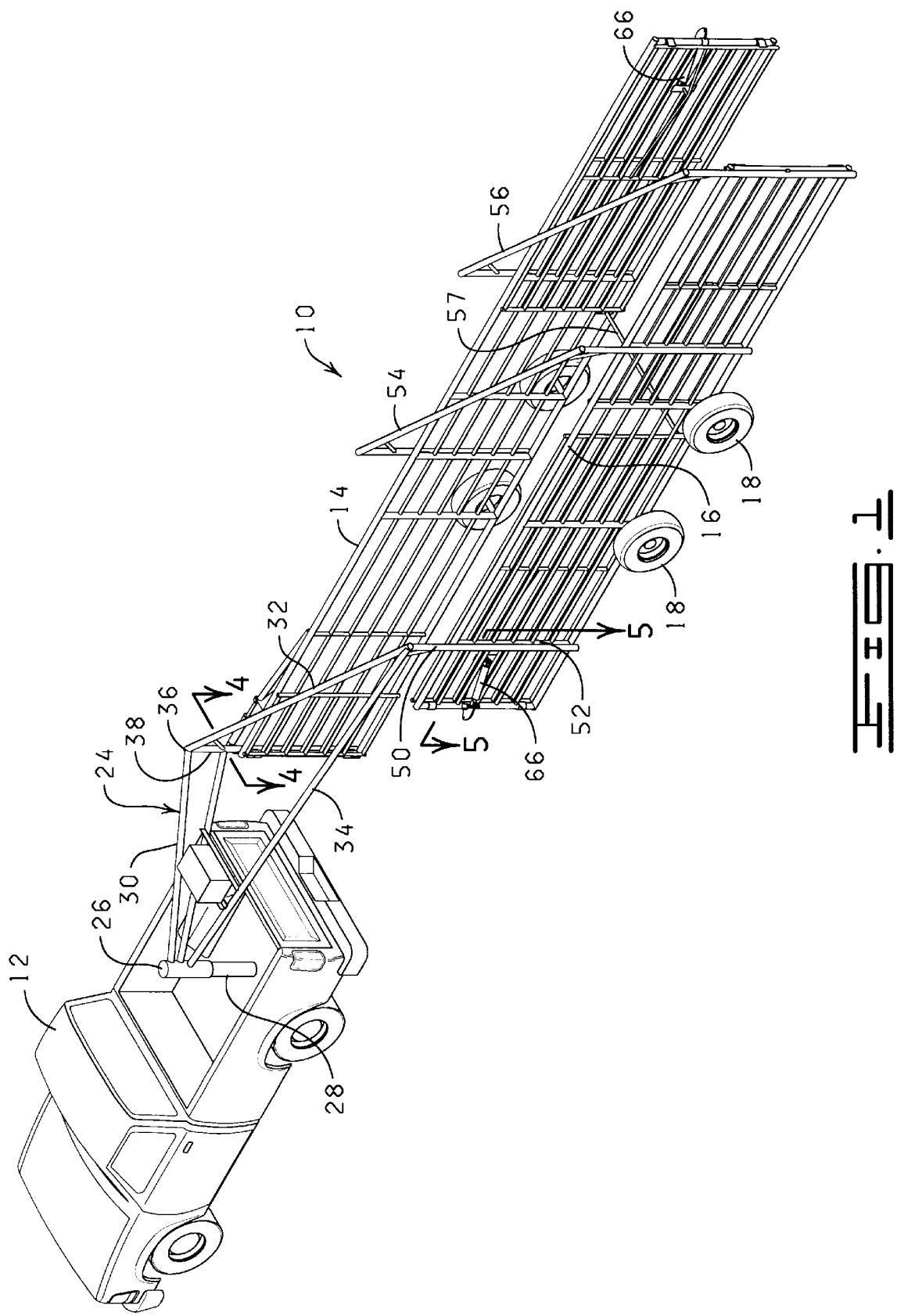
FIG. 1 is a schematic, isometric view of the portable corral of this invention shown in a retracted position behind a towing vehicle.
Figure 2:
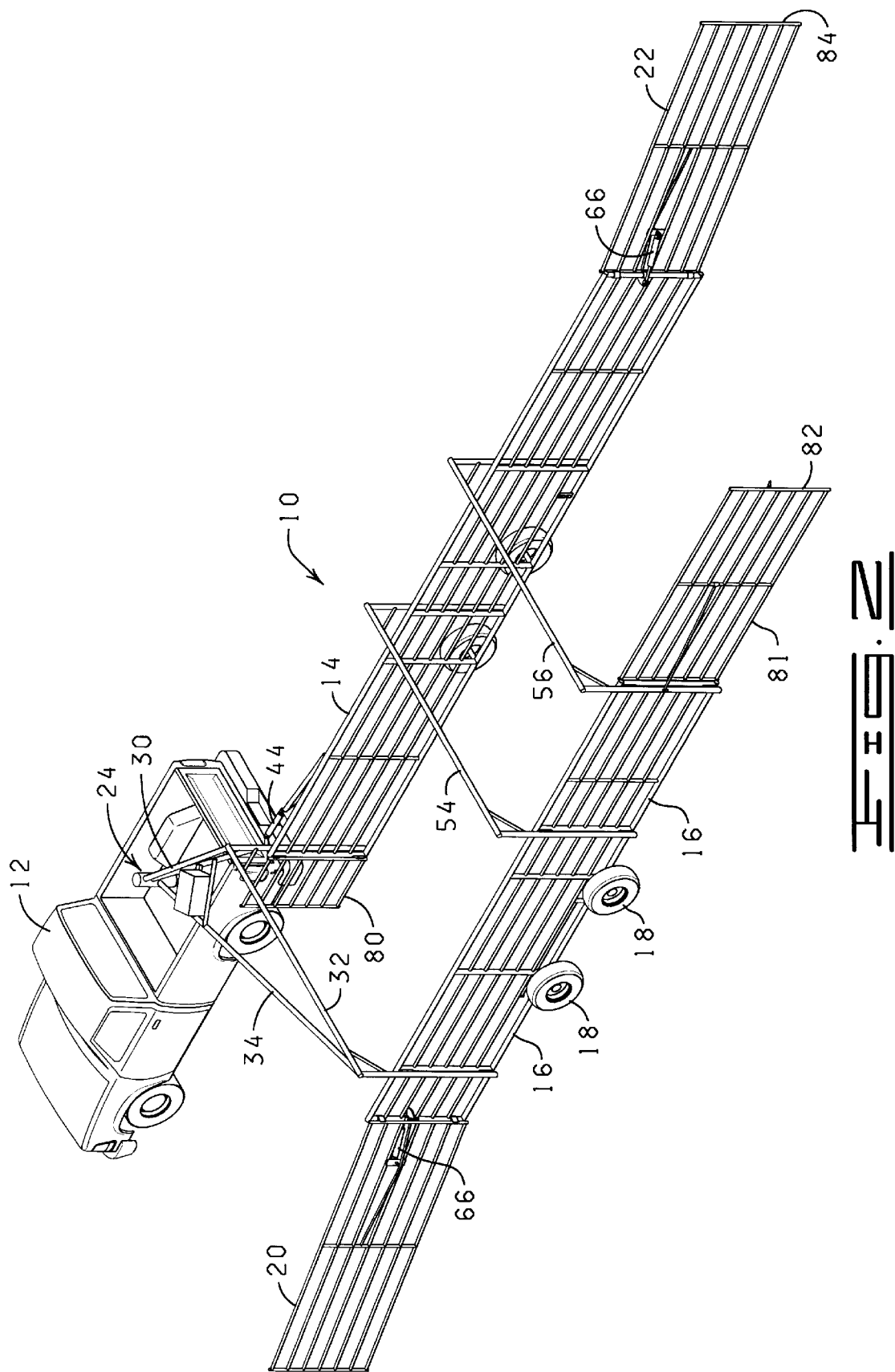
FIG. 2 is a schematic, isometric view of the portable corral of this invention shown in an expanded position to be towed along a path along side the towing vehicle.
Figure 3:
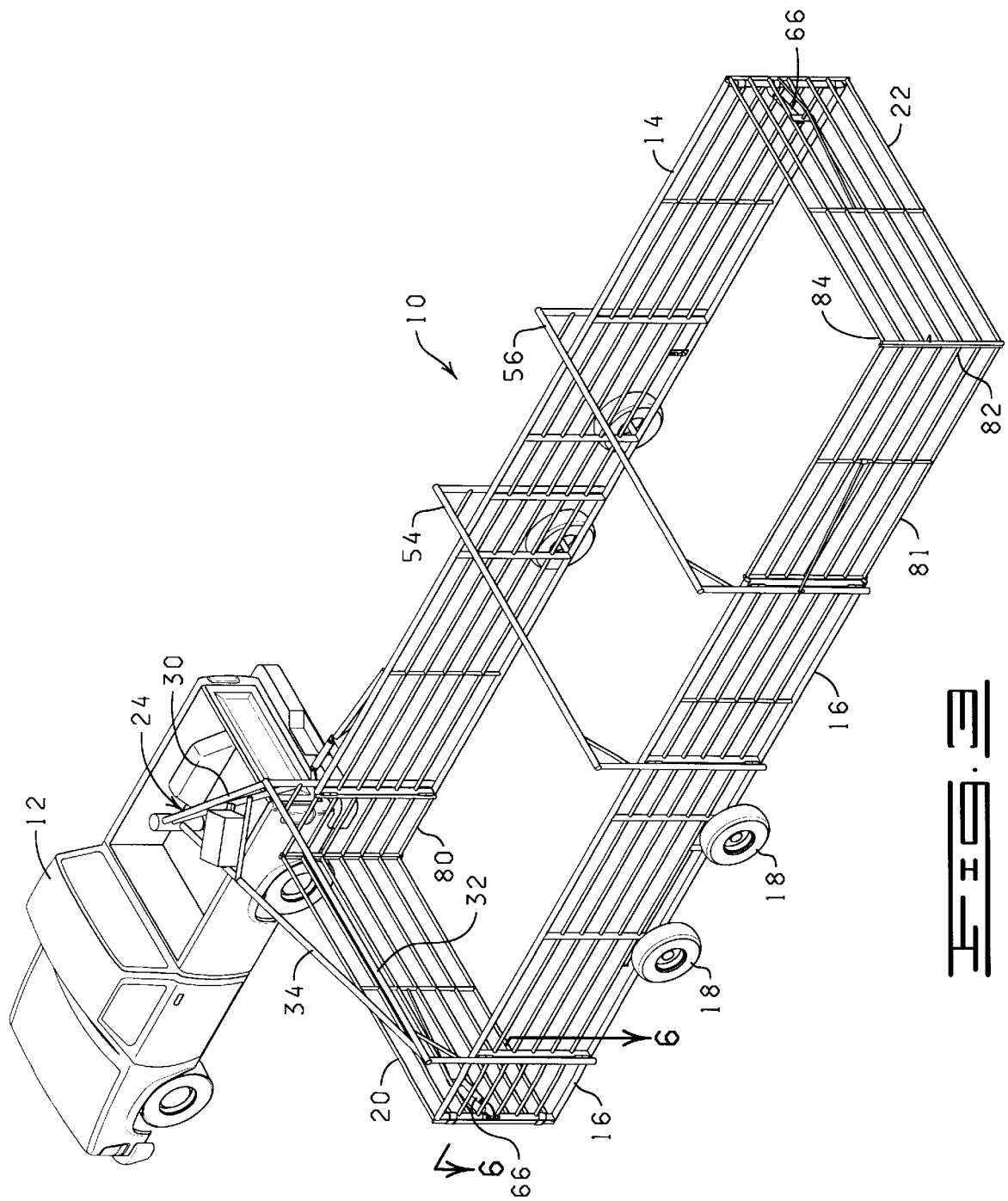
FIG. 3 is an isometric view similar to FIG. 2, with the end gates of the portable corral closed.

Referring to the drawings in detail, and particularly FIG. 1, reference character 10 generally designates the portable corral of this invention shown in a retracted position when the corral is being towed by a vehicle 12. FIG. 2 illustrates the position of the corral 10 when it is in an expanded position to travel along side the path of the vehicle 12 and whereby the corral 10 may be moved around cattle, such as those which may be fed in a path along side the path of travel of the vehicle 12. FIG. 3 is a view similar to FIG. 2, but with the corral in a closed position where animals may be trapped within the corral.

The corral 10 basically comprises a right hand side panel 14 and a left hand side panel 16, each of which is supported by a pair of wheels 18 in order that the corral may be pulled over the ground by the towing vehicle 12. In general, the corral 10 also includes a front gate 20 and a rear gate 22 as most clearly shown in FIG. 2. The corral 10 further includes a truss type structure 24 for connecting the corral to the towing vehicle 12, whereby the corral may be towed behind the vehicle 12 as shown in FIG. 1, or towed in a path along side the vehicle 12 as shown in FIG. 2.

Figure 4:
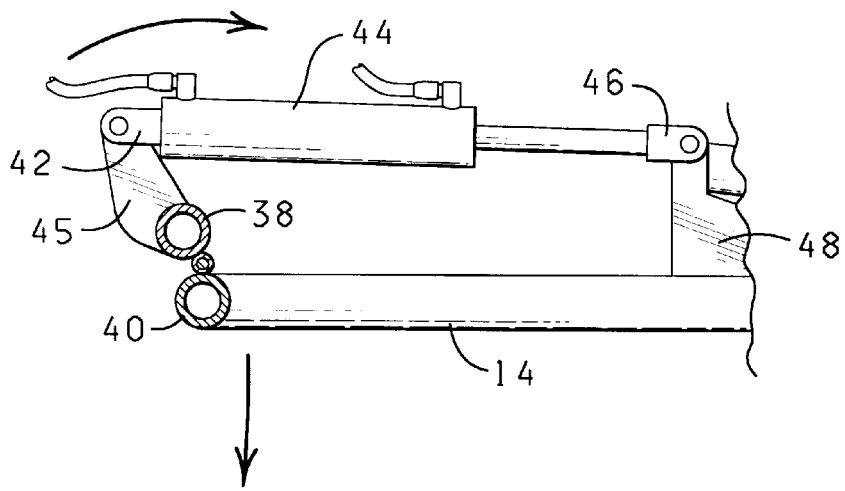
FIG. 4 is an enlarged cross sectioned view taken along lines 4—4 in FIG. 1.
Figure 4A:
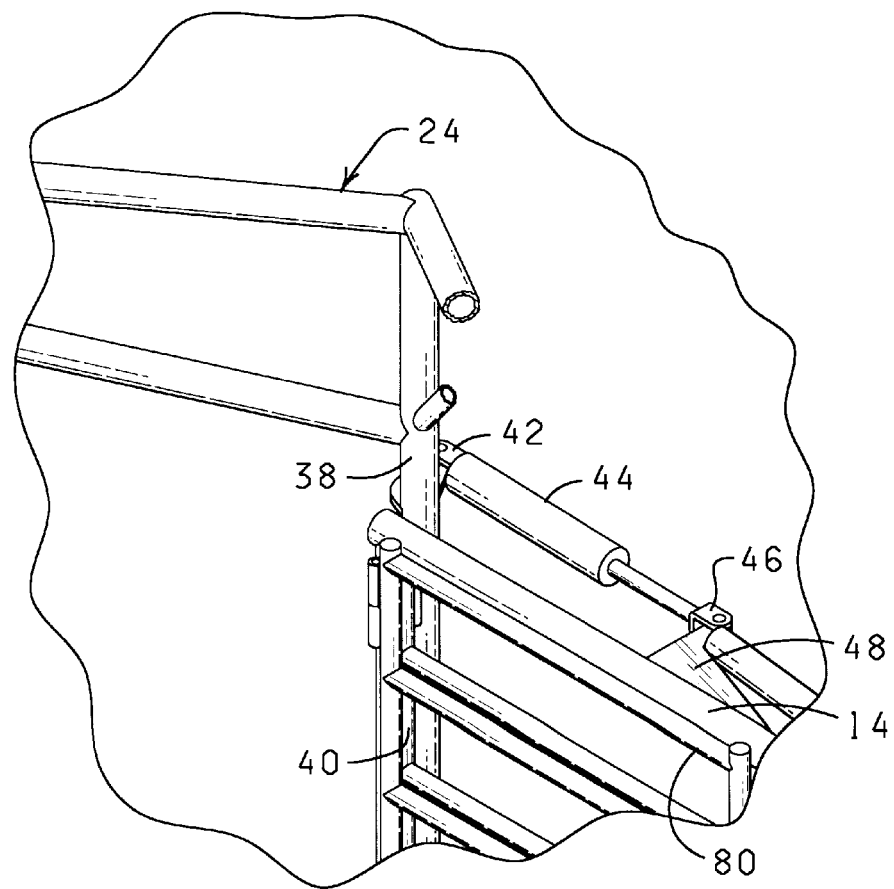
FIG. 4A is an enlarged perspective view, with portions shown in cross section, of the right front corner of the corral when the corral is in the position shown in FIG. 1.
Figure 4B:
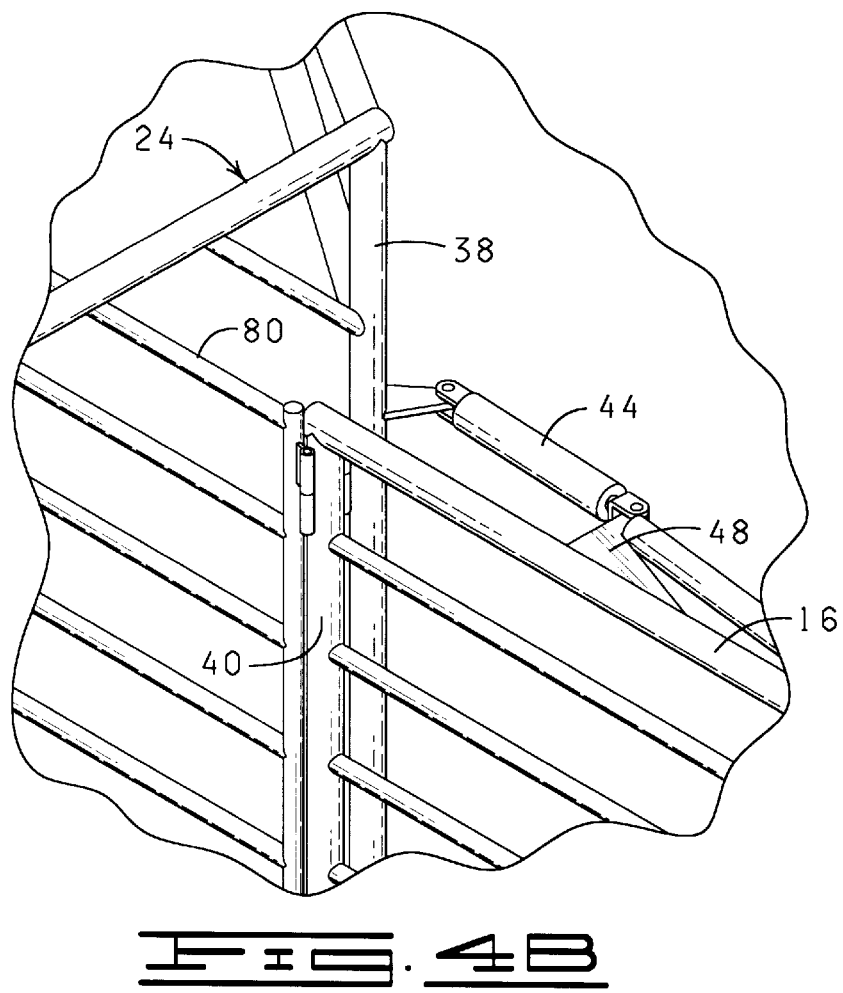
FIG. 4B is a perspective view similar to FIG. 4, with the corral in the position shown in FIG. 2.

The towing structure 24 comprises a front piece 26 which pivotally fits over a post or other fifth wheel 28 mounted on the bed of the vehicle 12, such that the structure 24 can pivot around the post 28. The towing structure 24 includes a triangular shaped assembly or truss consisting of pipes 30, 32 and 34 all welded together in the manner shown in the drawings. The apex 36 of the structure 24 is secured to a vertical post 38 (see FIG. 4) which is pivotally secured to a vertical post 40 formed as the front end portion of the right hand panel 14. One end 42 of a hydraulic cylinder 44 is pivotally secured to the vertical post 38 of the towing structure 24 through an arm 45. The piston end 46 of the cylinder 44 is pivotally secured to the right hand side panel 14 through suitable bracing 48.

As shown in FIG. 1, the rearward ends of the pipe members 32 and 34 are rigidly secured to a vertical post 50 which is in turn pivotally secured to a vertical member 52 of the left hand side panel 16. The side panels 14 and 16 are also interconnected by bracing cross members 54 and 56. Each end of the cross members 54 and 56 is pivotally secured to the respective side panels 14 and 16 in order to allow movement of the side panels between the position shown in FIG. 1 and FIG. 2. A cross brace 57 is suitably attached to the side panels 14 and 16 when the corral is being towed behind the vehicle 12 to assist in maintaining the corral in a retracted position.

With the towing structure 24 and the cross members 54 and 56, the panels 14 and 16 may be moved between the positions shown in FIG. 1 and FIG. 2 by actuation of the cylinder 44. With the cylinder 44 in the retracted position, the side panels 14 and 16 will be in the position shown in FIG. 1, and when the cylinder 44 is expanded, the towing structure 24 will pivot between the positions shown in FIG. 1 and FIG. 2, along with a simultaneous expansion of the distance between the side panels 14 and 16 from the position shown in FIG. 1 to the position shown in FIG. 2. The expansion and retraction of the cylinder 44 is best performed when the corral 10 and the towing vehicle 12 are moved in a generally forward direction.

The front gate 20 operating mechanism is shown in FIGS. 5, 5A, FIG. 6 and FIG. 6A. In the retracted position of the corral, the front gate 20 will be in the position shown in FIGS. 5 and 5A; that is, along side the side panel 16. One end 58 of the gate 20 is pivotally secured to the front post 60 of the side panel 16 by suitable hinge plates 62, such that the gate 20 may be moved between the position shown in FIG. 1 to the position shown in FIG. 2, and then to the closed position as shown in FIG. 3. One end 64 of a hydraulic cylinder 66 is pivotally secured to the gate 20 and the rod end 68 of the hydraulic cylinder 66 in pinned to a generally triangular shaped plate 70. The plate 70 is pivotally secured to the front post 60 of the side panel 16 and has a pair of apertures 72 and 74 in the outward corners thereof. An arm 76 is rigidly secured to the post 60 and has an aperture in the outer end thereof which can mate with either one of the apertures 72 or 74 of the plate 70.

Figure 5:
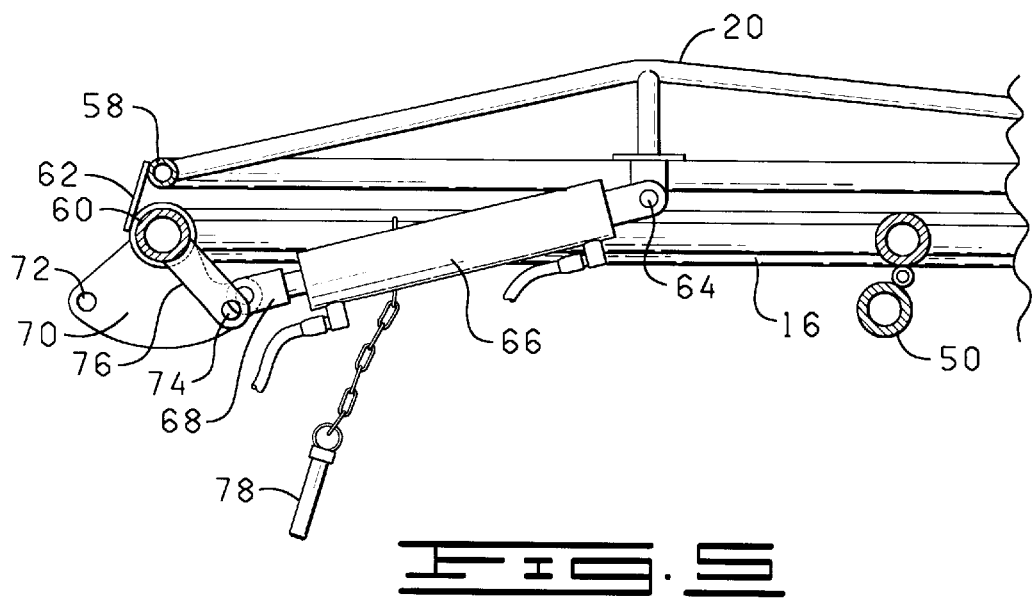
FIG. 5 is an enlarged cross sectioned view taken along lines 5—5 in FIG. 1.
Figure 5A:
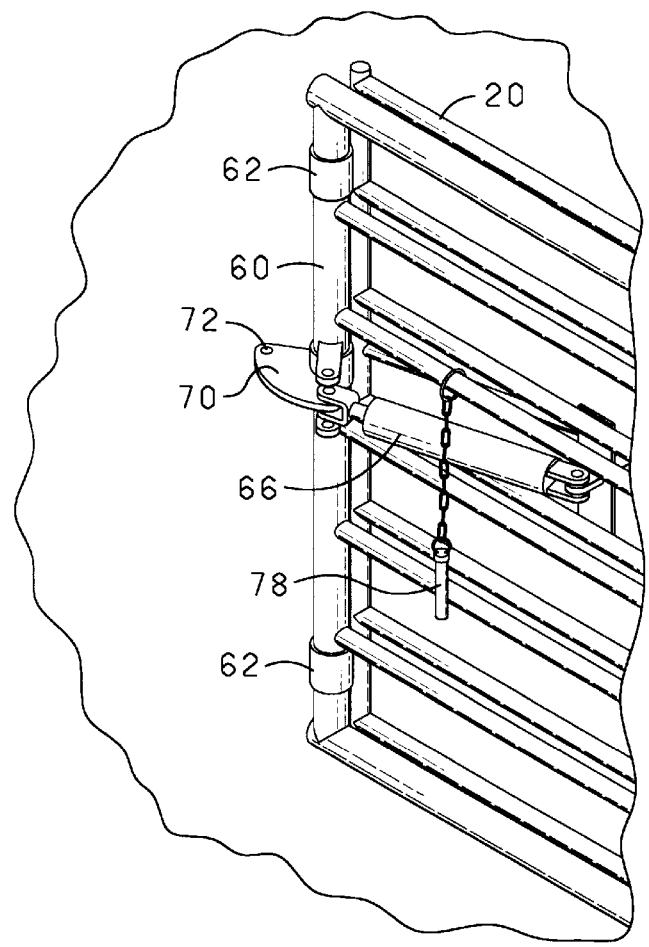
FIG. 5A is an enlarged perspective view of the left front corner of the corral when the corral is in the position shown in FIG. 1.
Figure 6:
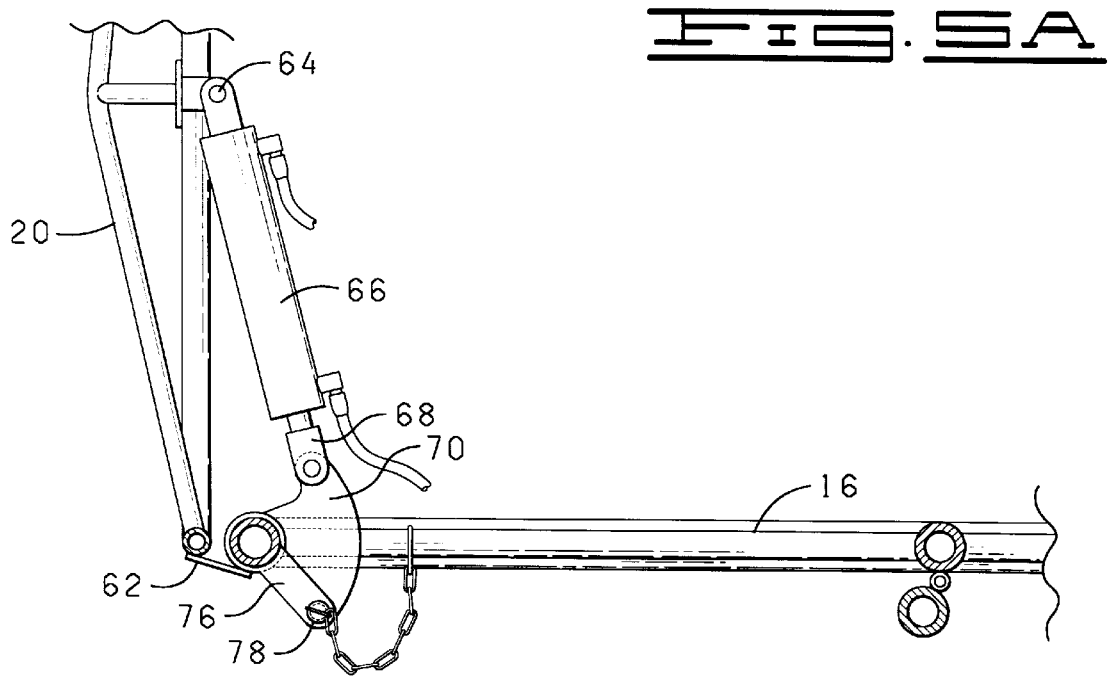
FIG. 6 is an enlarged cross sectioned view taken along lines 6—6 in FIG. 3.
Figure 6A:
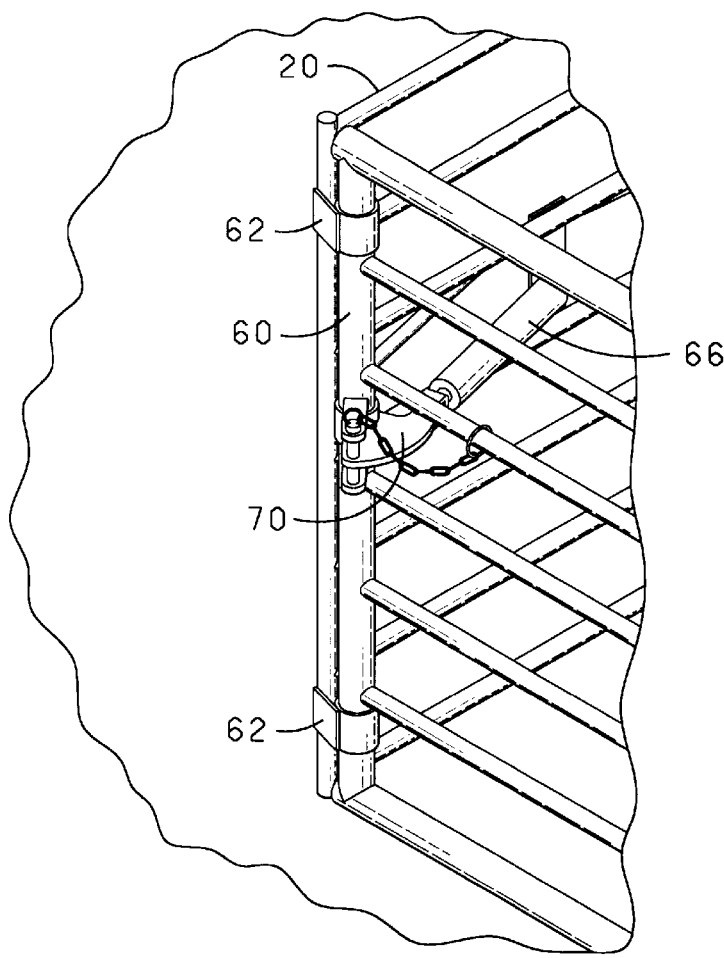
FIG. 6A is a perspective view of the same structure shown in FIG. 6 for clarity of illustration.
Figure 6B:
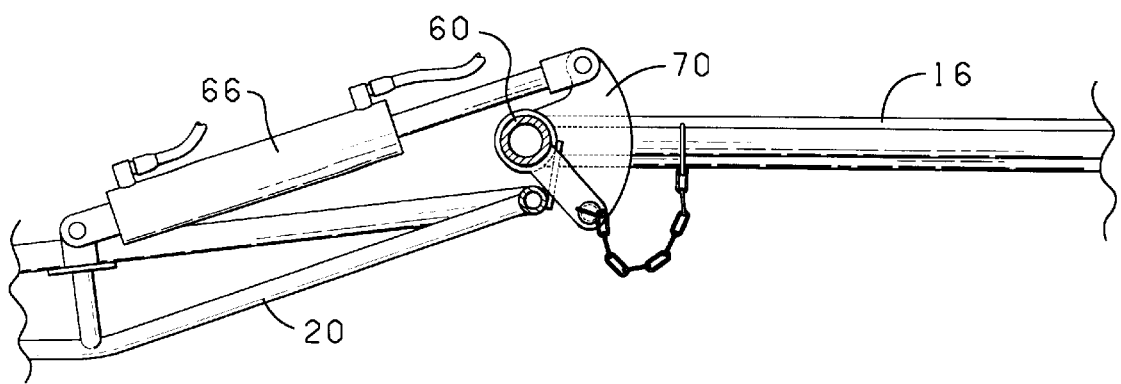
FIG. 6B is a plan view of the left front corner of the corral when the corral is in the position as shown in FIG. 2.

In the traveling position of the corral 10 (as shown in FIG. 1), the gate 20 is suitable secured to the side panel 16 in the position shown in FIGS. 5 and 5A. When the corral 10 is in the expanded position as shown in FIG. 2, the gate 20 is first manually pivoted to the position shown in FIGS. 6 and 6A; whereupon a pin 78 is inserted in the mating aperture 74. The cylinder 66 is then expanded to move the gate 20 to the fully open position as shown in FIGS. 2 and 6B, such that the corral 10 may be moved forwardly to enclose animals located adjacent to the path of travel of the vehicle 12. When the animals are within the corral 10, the cylinder 66 is again retracted to move the gate 20 to the closed position shown in FIGS. 3 and 6A. At or about the same time, a small pivoting panel 80 pivotally secured to the front post 40 of the side panel 14 is manually swung to a position in alignment with the side panel 14 as shown in FIGS. 2 and 3, whereby the gate 20 may be secured to the free end of the panel 80 and the front portion of the corral 10 then fully closed.

One end of the rear gate 22 is attached to the rear end of the right side panel 14 using a hydraulic cylinder 66 in the same manner as the connection of the front panel 20 to the front end of the side panel 16. The rear gate 22 is thus operated in the same way as the front gate 20.

As also shown most clearly in FIG. 2, an panel extension 81 is pivotally secured to the rear end of the left side panel 16 and is manually moved between the position shown in FIG. 1 where it is along side the rear portion of the side panel 16, to the extended position shown in FIGS. 2 and 3 in alignment with the side panel 16. Thus, the free end 82 of the extension 81 is suitably secured to the free end 84 of the gate 22 in any suitable manner to retain the corral 10 in a closed position around animals.

When it is desired to move the corral from a location where the corral is in use to a position where the corral can be towed behind the vehicle 12, the front gate 20 and the rear gate 22 are moved from the positions shown in FIG. 3 to the positions shown in FIG. 2, and then to the positions shown in FIG. 1; whereupon the towing mechanism 24 may be actuated to retract the corral to the position shown in FIG. 1. The corral 10 may then be towed to the desired next position. It will also be understood that when the corral 10 is moved from the expanded position to the retracted position, the extension 80 is moved from the position shown in FIGS. 2 and 3 to the position shown in FIG. 1, and the rear extension 81 is moved to the stored position from the position shown in FIG. 2 to the position shown in FIG. 1.

Figure 7:
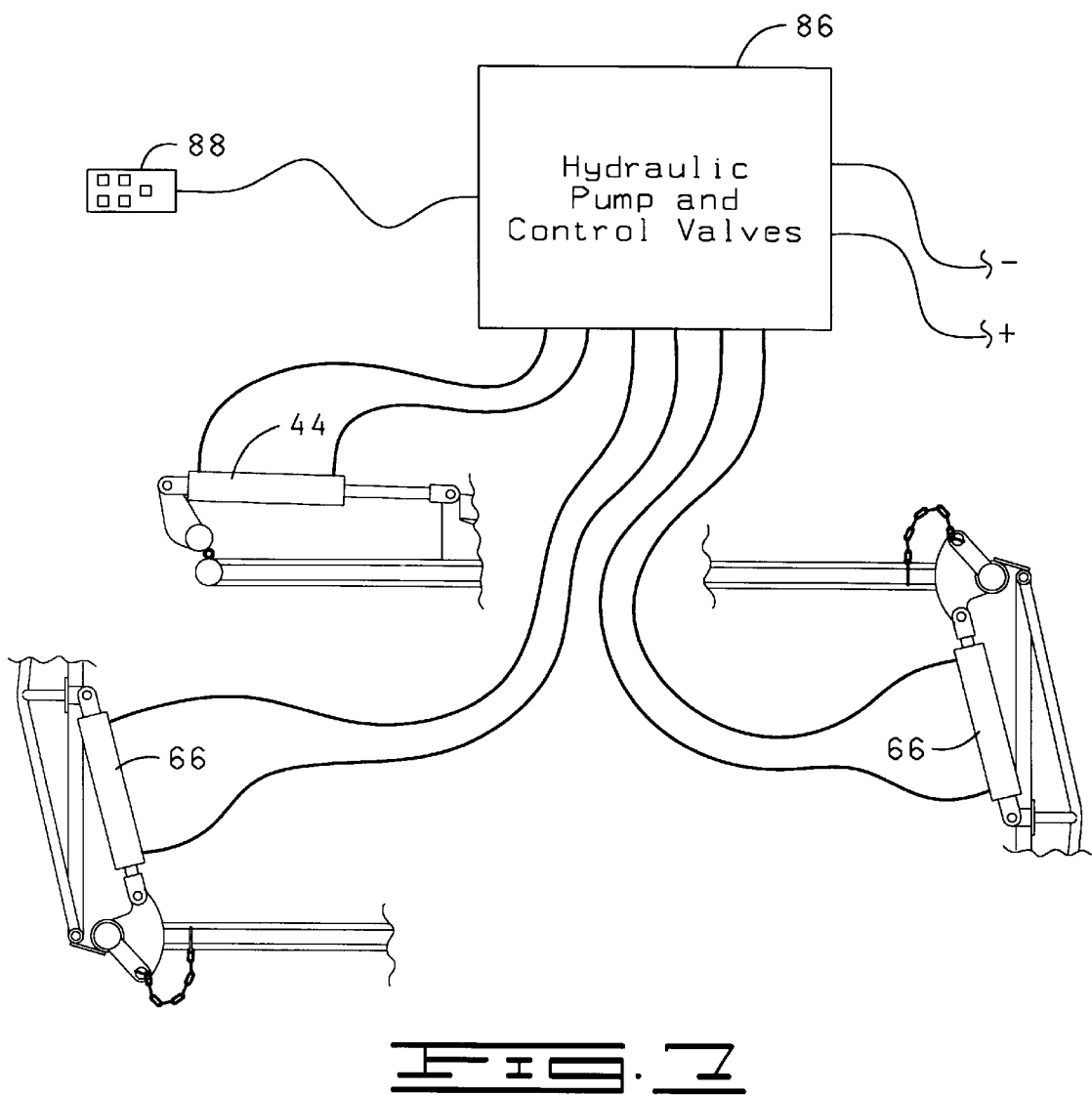
FIG. 7 is a schematic hydraulic diagram showing the connections required for the various cylinders used in the corral.

As shown in FIG. 7, the hydraulic cylinders 44 and 66 are operated from a central control unit 86 which will be conveniently located in the cabin of the towing vehicle 12 and can be controlled by a remote control 88, as well known by those skilled in the art, such that the cylinders 44 and 66 can be appropriately operated at the appropriate times in the manner described above.

Changes may be made in the combination and arrangement of the various parts as shown and described without departing from the spirit and scope of the invention as defined in the following claims.

What is claimed is:

1. A portable corral adapted to be pulled in a retracted position behind a towing vehicle and in an expanded position along a path to one side of the towing vehicle, comprising:
   a first portable side panel having a front end and a rear end;
   a second portable side panel having a front end and a rear end; and
   a truss comprising three members rigidly interconnected in a triangular configuration when viewed in plan having one apex thereof pivotally secured to the towing vehicle and the other apexes thereof pivotally secured to the first and second side panels adjacent the front ends thereof thereby allowing the portable corral to be pulled in the retracted position behind a towing vehicle and in the expanded position along a path to one side of the towing vehicle.

2. A corral as defined in claim 1, further including at least one bracing member pivotally secured to the medial portions of the first and second side panels.

3. A corral as defined in claim 1 characterized further to include:
   a gate pivotally secured to one side panel adjacent the front end thereof sized to span the distance between the side panels when the corral is in an expanded position.

4. A corral as defined in claim 3 characterized further to include a gate pivotally secured to one side panel adjacent the rear end thereof sized to span the distance between the side panels when the corral is in an expanded position.

5. A corral as defined in claim 4 characterized further to include a hydraulic ram secured to each of said gates and to the respective side panel to which the gate is secured.

6. A corral as defined in claim 5 characterized further to include a control system in the towing vehicle connected to each of said rams.

7. A corral as defined in claim 1 where in each side panel is supported by a pair of wheels.

8. A corral as defined in claim 1 characterized further to include a brace adapted to be secured between said side panels when the corral is in a retracted position.

9. A corral as defined in claim 1 characterized further to include means for pivoting the truss about the apex thereof secured to the towing vehicle to move the side panels between their retracted and expanded positions while the towing vehicle is in motion.

10. A corral as defined in claim 9 wherein said means includes:
   a post rigidly secured to each of the apexes of the truss other than the apex secured to the towing vehicle and pivotally secured to each side panel adjacent the front end thereof; and
   a hydraulic ram connected to one of said posts and one side panel in a position to turn said truss.

* * * * *